No. 844,309. PATENTED FEB. 12, 1907.
R. MILLER.
CLAMP.
APPLICATION FILED JUNE 11, 1906.

WITNESSES:
O. E. Murray
M. A. Schmidt

INVENTOR
Robert Miller
BY
Milo B. Stevens and Co.
Attorneys.

UNITED STATES PATENT OFFICE.

ROBERT MILLER, OF COVINGTON, TENNESSEE, ASSIGNOR OF ONE-HALF TO RUFUS M. GILLIHAN, OF RANDOLPH, TENNESSEE.

CLAMP.

No. 844,309.  Specification of Letters Patent.  Patented Feb. 12, 1907.

Application filed June 11, 1906. Serial No. 321,193.

*To all whom it may concern:*

Be it known that I, ROBERT MILLER, a citizen of the United States, residing at Covington, in the county of Tipton and State of Tennessee, have invented new and useful improvements in Clamps, of which the following is a specification.

This invention is a clamp to be used in connection with a wire-fence stretcher, and has for its object to provide a simple and efficient clamp which will securely hold the wire under the most severe strain.

Figure 2:
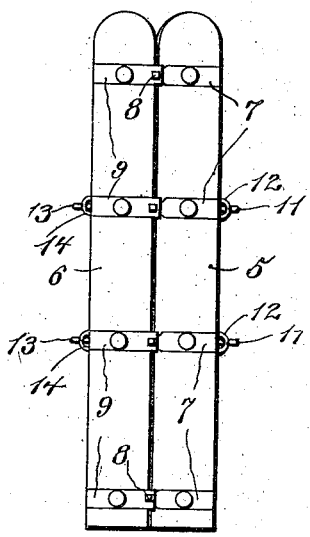
Figure 1:
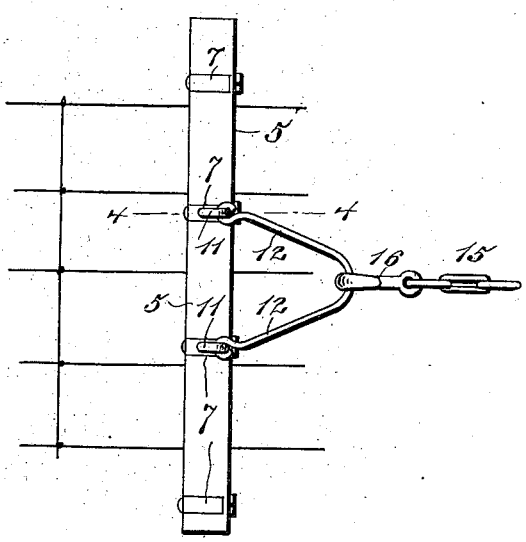
Figure 3:
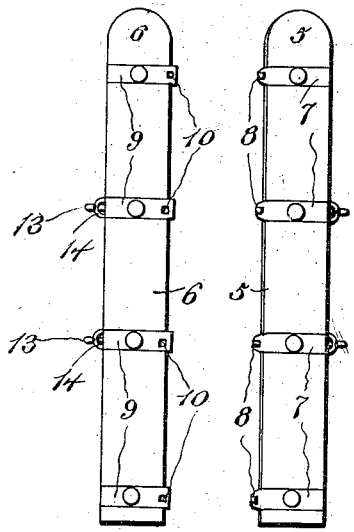
Figure 4:
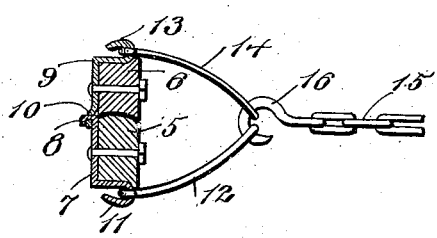

In the accompanying drawings, Figure 1 is a side elevation of the invention, showing the application thereof. Fig. 2 is a rear elevation. Fig. 3 is a rear elevation showing the clamp open. Fig. 4 is a horizontal section on the line 4 4 of Fig. 1.

Referring specifically to the drawings, 5 and 6 respectively denote two bars which extend parallel and are hinged together to form the jaws of the clamp, the wire being placed between the meeting faces of the bars. To the bar 5 are bolted a number of straps 7, having hooks 8 at one end, and to the bar 6 are bolted straps 9, formed with eyes 10, engageable by the hooks 8, these parts forming hinge members, which can be separated, as shown in Fig. 3, to admit the wire between the jaws.

The two middle straps 7 extend around to the side of the bar 5 and are formed with hooks 11, to which a bail 12 is attached. The two middle straps 9 are formed with similar hooks 13, to which a bail 14 is attached. The bails extend in front of the bars 5 and 6 and serve as attaching means for the hauling-chain 15 of the stretcher, (not shown,) said chain carrying a hook 16, which is slipped over the bails. As the pull on the bars is on the opposite side of the hinge connection the bars will be drawn together and the wires will be securely clamped between the opposing faces thereof. The clamping-face of one of the bars is slightly concave, and the other is convex, as shown in Fig. 4, which effectively prevents slipping of the wire.

The clamp herein described is intended for stretching several wires simultaneously or an entire fence-section, as shown in Fig. 1, and it can be made in different sizes according to the height of the fence to which it is to be applied. A further advantage of the clamp is its simplicity of construction and that it can be readily applied and removed.

I claim—

A clamp comprising a pair of bars, upper and lower pairs of straps secured to the bars, the straps of each pair having a hinge connection at one end, and hooks at the other end, and a pair of bails each of which is connected at its ends to the hooks of the upper and lower straps whereby a connection between each bail and the bars is had at two points, the arms of the bails being vertically spaced and extending in front of the bars, and engageable at the middle by a hauling-chain.

In testimony whereof I have signed my name to this specification in the presence of two subscribing witnesses.

ROBERT MILLER.

Witnesses:
W. A. OWEN,
W. M. HUGHES.